3,556,968
INHIBITION OF DISCOLORATION OF ELECTRO-
DEPOSITED ORGANIC COATINGS
Joseph M. De Vittorio, Homewood, Ill., assignor to Sherwin-Williams Company, Cleveland, Ohio, a corporation of Ohio
No Drawing. Filed Mar. 3, 1966, Ser. No. 531,367
Int. Cl. B01k 5/02; C23b 13/00
U.S. Cl. 204—181                9 Claims

ABSTRACT OF THE DISCLOSURE

Resin coatings are electrodeposited on to a metal substrate by pretreating the substrate with a chelating agent or by incorporating the chelating agent into the coating composition, thereby inhibiting discoloration of the electrodeposited coating.

---

This invention relates to the reduction, inhibition or prevention of discoloration of electrodeposited coatings and particularly to the inhibition of yellowing of organic resin coatings which have been electrodeposited on to a metal surface, especially a ferrous metal surface, from an aqueous dispersion of a coating composition containing such resin.

In recent years it has been recognized that the electrodeposition of organic coatings on a metal substrate has advantages over conventional methods of applying such coatings, for example, in providing more uniform and controlled thickness on contoured and angular surfaces. One difficulty which arises, however, is the tendency of the metal substrate to undergo electrolysis which causes discoloration of the coating. This is particularly objectionable when a white coating is electrodeposited.

It would therefore be desirable to provide a way of avoiding and overcoming the aforementioned problem.

To this end, one of the objects of the present invention is to provide a new and improved process for applying organic coatings to a metal substrate.

A further object is to provide new and improved coating compositions which are especially useful for application to a metal substrate by electrodeposition. Other objects will appears hereinafter.

In accordance with the invention it has been found that new and improved results in the electrodeposition of resin coatings from an aqueous dispersion of a film forming resin in water on to a metal substrate are obtained by contacting the metal substrate with a chelating agent. The chelating agent can be applied to the metal substrate as a pre-treatment before the electrodeposition of the resin, for example, by dipping, spraying or otherwise applying a solution of the chelating agent to the metal substrate, or by incorporating the chelating agent in the coating composition.

A preferred procedure is to incorporate the chelating agent into the resinous coating composition to be electrodeposited. In particular the invention contemplates the provision of water dispersed coating compositions containing at least one water dispersible coating resin and a chelating agent neutralized or partially neutralized with an amine which acts as a solubilizing agent for said resin in water based coating compositions, and the use of such coating compositions as electrolytes for the electrodeposition of a resinous coating on a metal substrate, especially ferrous metals, for example, iron and steel.

It will also be understood that the chelating agent can be used both in a pretreatment of the metal substrate and as an additive to the electrodeposition bath.

The term "chelating agent" means a compound which forms a chelate with metal ions. The term chelate is used herein as defined in Hackh's Chemical Dictionary, third edition. A chelating agent has a plurality of function groups, .e.g., —OH, —COOH, and —COONa capable of forming a ring structure with a heavy metal atom. Chelation has been defined as an equilibrium reaction between a metal ion and a complexing agent, characterized by the formation of more than one bond between the metal and a molecule of the complexing agent and resulting in the formation of a ring structure incorporating the metal ion. Chelating agents control metal ions by blocking the reactive sites of the metal ion and preventing it from entering into its normal reactions. The present invention is especially concerned with the use of chelating agents containing acidic groups which are present as such or have been at least partially neutralized.

Chelating agents containing acidic groups are reactive with amines. Examples of such chelating agents are: ethylene diamine tetraacetic acid (EDTA), diethylene triamine pentaacetic acid (DTPA), trans-1,2-diamino-cyclohexane tetraacetic acid monohydrate, N-hydroxyethylethylene diamine triacetic acid (HEDTA), citric acid, and phosphoric acid chelating agents (e.g., Dequest 2000).

Chelating agents containing groups reactive with amines can be neutralized or partially neutralized with amines. Thus, the chelating agents containing free carboxy groups specifically set forth above can be partially neutralized by adding thereto in amounts sufficient to supply less than one reactive amino group per carboxy group any one of the following amines or mixtures thereof: diethylene triamine, triethanolamine, diisopropanolamine, triisopropanolamine, and diethanolamide. These same amines and mixtures thereof can be employed in coating compositions of the type described.

The chelating agent should dissociate in water, be stable under baking conditions at 275° F. to 425° F. for 5–30 minutes and be stable to hydrolysis (i.e. have hydrolytic stability) at a pH above 6 and below 9. Optimum results have been obtained by baking to dryness at a temperature not higher than 375° F.

The pH of the composition to be electrodepositedshould be within the range of 6.5 to 8.5.

The concentration of the chelating agent in the coating composition applied to the metal substrate should not exceed 1.5% and preferably should be within the range of 0.1% to 1.0%. However, when the chelating agent is applied separately to the substrate in a solution, the concentration can vary widely, e.g., 2% to 20%.

The resin in the composition to be electrodeposited should be capable of forming a clear coating which does not discolor under the aforementioned baking conditions.

The total solids in the composition to be deposited should preferably by 5–15% by weight.

The solvent can be water or a water miscible solvent or mixture of solvents including, for example, the butyl ether of ethylene glycol, the butyl ether of diethylene glycol, the ethyl ether of ethylene glycol, the ethyl ether of diethylene glycol, butanol, isobutanol and mixtures of one or more of these solvents with water.

Examples of specific classes of resins are the acrylic resins, which are derived by polymerization through an olefinic bond and polyester esters which are derived by esterification of polyhydric alcohols and polycarboxy acids. Specific examples of acrylic resins are (A) butyl acrylate, styrene, methacrylic acid copolymers; (B) butyl acrylate, acrylic acid, acrylamide copolymers; and (A) plus up to 10% by weight tris (hydroxy methyl) amino methane. The weight ratios of monomers used in forming these copolymers can vary but can be, for example, 60:25:15 in the order given for each resin. Catalysts such as cumene hydroperoxide and azobisbutyronitrile can be used in preparing these resins. The resin can contain melamine or hexamethoxymethyl melamine as a constituent.

The resins and their preparation do not constitute a part of this invention.

Examples of monomers used in preparing suitable polyester resins are neopentyl glycol, trimethyol ethane, trimellitic anhydride and azelaic acid. Other polyols and polycarboxy acids and anhydrides can be used.

The invention will be further illustrated but is not limited by the following examples in which the quantities are given in parts by weight unless otherwise indicated.

EXAMPLE I

A paint composition was prepared from the following ingredients:

| | Parts |
|---|---|
| Acrylic resin vehicle | 200 |
| Hexamethoxymethylmelamine | 25 |
| Titanium dioxide pigment | 39 |
| Distilled water | 730 |

This formulation gives a paint having a total solids content of 15% by weight and a pigment volume concentration of 8%.

The acrylic resin was prepared by heating together 54.6 parts butyl acrylate, 22.7 parts styrene, and 13.6 parts methacrylic acid at 300° F. for 3 to 3½ hours with the addition also of 10 grams per gallon of cumene hydroperoxide and 20 grams per gallon of azobisisobutyronitrile. One-half hour before the end of the cook, 9.1 parts of tris(hydroxymethyl)aminomethane was added. The resultant product was then diluted with a solvent solution consisting of 36.4% butylether of ethylene glycol, 60.1% water, and 3.5% of a mixture of amines consisting of 21.7% diethylene triamine and 78.3% diisopropanolamine.

The foregoing pigmented coating composition was electrodeposited onto metal substrate in a 950 ml. cell at a voltage of 125 volts direct current and a bath temperature of 80° F. for 90 seconds. The electrodeposited coating was baked for 60 seconds at 400° F.

Prior to electrodeposition, each of the metal panels employed as a substrate was allowed to stand in a 10% solution of Versene 200, a form of EDTA. The panels were then removed and wiped dry. Control panels were also run which had not been pretreated with the Versene solution. Similar tests were carried out with pretreatments in which the solution of the chelating agent was used at concentrations of 2%, 4%, 6%, 8%, 10%, 12% and 20%. The results obtained at 10% appeared to be best. The electrodeposited panels after baking were tested on a Color-Eye testing device for measuring their relative whiteness and the results are shown in the following table in which X, Y and Z give the whiteness readings and $x$, $y$ and $z$ give the increments of increased brightness obtained by the treatment of the chelating agent.

TABLE I

| Panel: | X | Y | Z | $x$ | $y$ | $z$ |
|---|---|---|---|---|---|---|
| $A_1$ | 91.0 | 92.4 | 95.5 | | | |
| $B_1$ | 94.5 | 95.1 | 98.8 | 3.5 | 2.7 | 3.3 |
| $A_2$ | 91.4 | 91.5 | 93.3 | | | |
| $B_2$ | 94.2 | 94.8 | 98.2 | 2.8 | 3.3 | 4.9 |
| $A_1$ | 92.0 | 92.7 | 96.0 | | | |
| $B_1$ | 93.7 | 94.6 | 98.5 | 1.7 | 1.9 | 2.5 |
| $A_2$ | 91.0 | 91.8 | 92.3 | | | |
| $B_2$ | 93.2 | 94.5 | 97.5 | 2.2 | 2.7 | 5.2 |
| $A_1$ | 91.5 | 92.5 | 96.0 | | | |
| $B_1$ | 93.6 | 94.7 | 98.5 | 2.1 | 2.2 | 2.5 |
| $A_2$ | 91.0 | 91.6 | 92.3 | | | |
| $B_2$ | 93.5 | 94.6 | 98.4 | 2.5 | 3.0 | 6.1 |
| Average readings: | | | | | | |
| $A_1$ | 91.50 | 92.53 | 95.83 | | | |
| $B_1$ | 93.93 | 94.80 | 98.60 | 2.43 | 2.27 | 2.77 |
| $A_2$ | 91.13 | 91.60 | 92.63 | | | |
| $B_2$ | 93.63 | 94.63 | 98.03 | 2.50 | 3.00 | 5.40 |

All of the foregoing tests were made on steel specimens which were plain carbon steels that had been polished and are commonly known as Q-steel panels. It will be noted that the A specimens are control panels and the B specimens represent the panels which had been treated with a chelating agent. The increments of increased whiteness represented by $x$, $y$ and $z$ are the differences between the readings obtained for the B panels and those obtained for the corresponding A panels. The standard used in calibrating the Color-Eye instrument for testing X, Y and Z was 89.67, 89.40 and 88.53, respectively.

EXAMPLE II

In this example, various paints were used containing acrylic resins, including: (a) a resin formed from butylacrylate, styrene, methacrylic acid and tris(hydroxymethyl)aminomethane as described in Example I; (b) a butylacrylate-acrylic acid-acrylamide resin; (c) a butylacrylate, styrene, methacrylic resin like (a) but without the tris(hydroxymethyl)aminomethane; (d) a resin similar to (c) except that diisopropanolamine was cooked into the resin for half an hour instead of being added as a diluent and diethylenetriamine was omitted, and (e) a resin similar to (d) but with diethylenetriamine added. These resins were mixed in proportions of 3 parts of resin to one part of hexamethoxymethylmelamine and formulated into water base paints at 15% total solids and pigmented with titanium dioxide to a pigment volume concentration of 8%.

The paints were electrodeposited at 125, 150 and 175 volts direct current for 90 seconds. The anodes were 2¾" x 5⅞" Q-steel panels. Electrodeposited aluminum panels were used as whiteness controls.

The electrodeposited panels were baked at 350° F. and at 400° F. for 30 minutes and at 300° F. for 45 minutes. The panels baked at 350° F. were considerably whiter than panels from the same bath baked at 400° F. Panels baked at 300° F. were not significantly whiter than those baked at 350° F.

Excellent white films were obtained on aluminum extrusions. The film thickness range was from 1.0 mil at 125 volts direct current to 1.2 mils at 175 volts direct current.

Paint prepared with resin (d) with no diethylenetriamine was whiter than paint prepared with resin (e).

EXAMPLE III

The procedure was the same as in Example II except that neutralized chelating agents were added to the paints before electrodeposition of coatings on the panels. These chelating agents were prepared by first titrating the acid chelating agent to neutrality using diisopropanolamine. The neutralized chelating agents were added at 1% and 2% concentrations in the paints being evaluated.

Q-steel panels were given a pretreatment of chelating agent by dipping the panel into a solution of the agent prior to electrodepositing. Solutions of the chelating agents were also applied to the panels by spraying with an atomizer. The panels were either wiped dry with a towel or dried with a hot air dryer after being treated with the chelating solution. The chelating solutions were evaluated at 20%, 10%, 5% and 1% concentrations.

In these evaluations the following chelating agents were used:

(1) Versene Acid (EDTA)
(2) Versene 100 (Disodium salt of EDTA)
(3) Versenex 80 (Pentasodium salt of DTPA)
(4) Versenol 120 (Trisodium salt of HEDTA)
(5) Dequest 2,006 (Phosphorus containing chelating
(6) Sodium citrate
(7) Versene Fe-3 Specific (sodium salt of N,N-di(hydroxyethyl)glycine
(8) Sodium gluconate
(9) Sodium citrate acid
(10) Dequest 2,000 (phosphorus containing chelating agent)
(11) citric acid
(12) Diethylenetriaminepentacetic acid (DPTA)
(13) Hydroxyethylenediaminetriacetic acid (HEDTA)
(14) Tetrasodium ethylene diamine tetraacetate
(15) Trans-1,2-diamino-cyclohexanetetracetic acid monohydrate All depositions were carried out on 2¾" x 5⅞" Q-steel panels using stainless steel cathodes and the 900 cubic centimeter capacity deposition cell. The comparisons were conducted on panels deposited for 90 seconds at 125 volts direct current. The optimum results were obtained with (3), (14) and (15).

The panels electrodeposited from paints containing 1% neutralized chelating agent were whiter than those deposited from control paints containing no chelating agent. The panels electrodeposited from paints containing 2% chelating agent showed foaming and severe discoloration.

The electrodeposited films were the cleanest white when the chelating agent was sprayed onto the panels with an atomizer prior to deposition.

EXAMPLE IV

This example illustrates the preparation of a paint suitable for electrodeposition containing triethanolamine as a chelating agent. In this example the resin used in the paint was a polyester type resin prepared by heating neopentyl glycol to 280° F. to 300° F., then adding trimellitic anhydride and azelaic acid and cooking at 325° F. to 335° F. to an acid value of 54 to 58.

The weight proportions employed were 47.10% neopentyl glycol, 35.45% trimellitic anhydride and 17.45% azelaic acid.

Seventy parts of this resin was then mixed with 17.5 parts of hexamethoxymethylmelamine, 8.45 parts triethanolamine, 41.2 parts of titanium dioxide and 50 parts water to provide a composition containing 14.4% total solids by weight and having a pigment volume concentration of 12%. The resin and the hexamethoxymethylmalamine were added to a solution of the water and amine with agitation.

This composition was employed to electrodeposit a white paint coating on metal light fixtures at a temperature 75° F. and a voltage of 80 to 130 volts direct current with an average current density of 2.75 amperes per square foot for 90 seconds.

From the foregoing examples it will be seen that the invention is useful in the prevention or inhibition of discoloration of electrodeposited organic coatings. It will be recognized that a number of variations can be made in the composition of the coating materials without departing from the invention.

It will be understood that while the invention is particularly applicable to the reduction (i.e., inhibition) of discoloration of coatings applied to a ferrous metal substrate, it is also applicable to other metal substrates which are subject to electrolysis under the conditions used in electrodepositing resin coatings.

The invention is hereby claimed as follows:

1. A process for applying a resin coating to a metal substrate which comprises uniformly applying a chelating agent to said substrate as a pretreatment and thereafter electrodepositing a resin coating onto said substrate from a coating composition, the amount of said chelating agent being effective to inhibit discoloration of the electrodeposited coating.

2. A process as claimed in claim 1 in which said coating composition comprises a resin dispersed in a solvent, said resin forming a coating when applied to a metal substrate and dried, and said composition being adapted to be electrodeposited onto such substrate, and 0.1% to 1.5% by weight of a neutralized chelating agent incorporated into said composition.

3. A process as claimed in claim 1 in which a chelating agent is applied separately to said substrate prior to electrodeposition of said coating and a neutralized chelating agent is also incorporated into said coating composition.

4. A process as claimed in claim 1 in which said chelating agent is applied as a 2–20% by weight solution.

5. A process as claimed in claim 1 in which the metal substrate is a ferrous metal.

6. A process as claimed in claim 1 in which the coating composition contains a white pigment.

7. A process as claimed in claim 1 in which one chelating agent is tetrasodium ethylene diamine tetraacetate.

8. A process as claimed in claim 1 in which the chelating agent is pentasodium diethylenetriamine pentaacetate.

9. A process as claimed in claim 1 in which the chelating agent is trans-1,2-aminocyclohexane tetraacetic acid monohydrate.

References Cited

UNITED STATES PATENTS

| 3,230,162 | 1/1966 | Gilchrist | 204—181 |
| 3,424,663 | 1/1969 | Weigel | 204—181 |

OTHER REFERENCES

Fink et al., "Electrodeposition and Electrochemistry of the Deposition of Synthetic Resins," Transactions of the Electrochemical Society, vol. 94, 1948, pp. 309–310, 315–318, 321–325, 336–339.

Narcus, "The Role of Chelating Agents in the Plating Industry," Metal Finishing, vol. 50, No. 3, March 1952, pp. 54–62.

HOWARD S. WILLIAMS, Primary Examiner

PO-1050
(5/69)

UNITED STATES PATENT OFFICE
CERTIFICATE OF CORRECTION

Patent No. 3,556,968      Dated January 19, 1971

Inventor(s) Joseph M. DeVittorio

It is certified that error appears in the above-identified patent and that said Letters Patent are hereby corrected as shown below:

Column 1, line 4, "to" should read -- to The --.

Column 2, line 31, "diethanolamide" should read -- diethanola --.

Column 3, line 32, "diisopropyanol" should read -- diisopropa --.

Column 4, line 62, "chelating" should read -- chelating agent --.

Signed and sealed this 22nd day of June 1971.

(SEAL)
Attest:

EDWARD M. FLETCHER, JR.
Attesting Officer

WILLIAM E. SCHUYLER, JR.
Commissioner of Patents